UNITED STATES PATENT OFFICE.

JAMES CONNELL, OF PORT HURON, MICHIGAN.

IMPROVEMENT IN PREPARATION OF TANNING-EXTRACTS.

Specification forming part of Letters Patent No. 29,143, dated July 17, 1860.

*To all whom it may concern:*

Be it known that I, JAMES CONNELL, of Port Huron, St. Clair county, State of Michigan, have invented a certain new and useful process for the preparation of an inspissated or solid aqueous extract of the tanning principles contained in trees or shrubs, of which the following is a full, clear, and exact description.

The great difficulty heretofore experienced in the production of an aqueous extract of the tanning or coloring principles contained in trees or shrubs, that would bear transportation without deterioration, arises from the fact that the simple aqueous extract of these principles is liable to ferment and decompose from the action of the atmosphere, and that aqueous extracts cannot be evaporated to dryness by ordinary means without deterioration.

The usual process adopted in the manufacture of aqueous extracts of the coloring or tanning principles contained in trees or shrubs has been to make the extract in the ordinary manner, with either cold or hot water, then concentrate it by evaporation to that degree it will bear without deterioration, after which foreign matter possessing none of the properties of the extract are added to absorb the moisture and prevent its decomposition. The objection to the concentrated aqueous extract thus prepared is that the foreign matter added to prevent its fermentation or decomposition frequently deteriorates the principle of the extract, or, when it does not produce this effect, it forms an inert mass that must be removed by the consumer before the extract can be used; and, moreover, the cost of the extract to the consumer is enhanced by the cost of transportation of the inert matter it contains, which is frequently one-half the weight, and also by the loss experienced in removing this matter before the extract is available for the purpose to which it is to be applied.

My invention relates to a simple, cheap, and effective process for the production of an inspissated or solid aqueous extract of the tanning principles contained in trees or shrubs, which is unaffected by the atmosphere and not liable to decomposition, and which contains no inert or foreign matter that is not available and does not possess the properties of the extract; and my process for the manufacture of this extract is, first, to make an aqueous extract, either with cold or hot water or with steam, of such parts of the body, bark, limbs, or leaves of the trees or shrubs as may be desired, or of all these parts together, and when of the required strength to evaporate it until it becomes inspissated to a greater or less degree, after which a sufficient quantity of the dried and pulverized parts of the tree or shrub containing the principle of the extract is mingled with it to thicken or render it solid.

By the addition to the concentrated extract of the desiccated and ground fiber of a plant containing the principles of the extract, the watery or other parts that render it liable to decomposition when exposed to the atmosphere are absorbed and fermentation prevented, so that it is unaffected by climate and will bear transportation without deterioration.

It will be seen that the article produced by my improved process is superior to that heretofore made by other processes, as all parts are available to the consumer, as it contains no matter injurious to the article and not possessing the properties of the extract itself.

What I claim as new, and desire to secure by Letters Patent, is—

The process of manufacturing the aqueous extract of the tanning principles contained in trees and shrubs by concentrating the extract by evaporation, and then mingling with it a desiccated and pulverized vegetable fiber containing the principles of the extract.

In testimony whereof I have subscribed my name.

JAMES CONNELL.

Witnesses:
   F. SOUTHGATE SMITH,
   EDWIN JAMES.